United States Patent
Sanden

(10) Patent No.: US 7,886,721 B2
(45) Date of Patent: Feb. 15, 2011

(54) FUEL RESERVOIR

(75) Inventor: Eduard-Siegfried Sanden, Wiesbaden (DE)

(73) Assignee: Continental Automotive GmbH, Hannover (DE)

(*) Notice: Subject to any disclaimer, the term of this patent is extended or adjusted under 35 U.S.C. 154(b) by 713 days.

(21) Appl. No.: 11/813,313

(22) PCT Filed: Dec. 7, 2005

(86) PCT No.: PCT/EP2005/056547
§ 371 (c)(1),
(2), (4) Date: Jan. 4, 2008

(87) PCT Pub. No.: WO2006/072525
PCT Pub. Date: Jul. 13, 2006

(65) Prior Publication Data
US 2008/0135561 A1    Jun. 12, 2008

(30) Foreign Application Priority Data
Jan. 4, 2005 (DE) .......... 10 2005 000 730

(51) Int. Cl.
*F02M 37/04* (2006.01)
(52) U.S. Cl. ............................ 123/509
(58) Field of Classification Search ............... 123/509; 137/556.22, 565.34, 574, 576
See application file for complete search history.

(56) References Cited

U.S. PATENT DOCUMENTS

| | | | | |
|---|---|---|---|---|
| 2,084,605 A * | 6/1937 | Webb | ................. | 123/497 |
| 4,569,637 A * | 2/1986 | Tuckey | ................. | 417/360 |
| 4,672,937 A * | 6/1987 | Fales et al. | ................. | 123/509 |
| 4,780,063 A * | 10/1988 | Tuckey | ................. | 417/360 |
| 4,795,320 A * | 1/1989 | Tuckey | ................. | 417/360 |
| 4,807,582 A * | 2/1989 | Tuckey | ................. | 123/514 |
| 4,893,647 A * | 1/1990 | Tuckey | ................. | 137/493 |
| 4,971,017 A * | 11/1990 | Beakley et al. | ................. | 123/510 |
| 5,038,741 A * | 8/1991 | Tuckey | ................. | 123/509 |
| 5,170,764 A * | 12/1992 | Tuckey | ................. | 123/509 |
| 5,218,942 A * | 6/1993 | Coha et al. | ................. | 123/514 |
| 5,253,628 A * | 10/1993 | Brown | ................. | 123/516 |
| 5,560,342 A * | 10/1996 | Fournier et al. | ................. | 123/509 |
| 5,647,328 A * | 7/1997 | Fournier et al. | ................. | 123/509 |
| 5,647,329 A * | 7/1997 | Bucci et al. | ................. | 123/509 |
| 5,680,847 A * | 10/1997 | Begley et al. | ................. | 123/509 |
| 6,029,633 A * | 2/2000 | Brandt | ................. | 123/509 |
| 6,149,399 A * | 11/2000 | Bowser et al. | ................. | 417/279 |

(Continued)

FOREIGN PATENT DOCUMENTS

CN    1138914 C    2/2004

(Continued)

OTHER PUBLICATIONS

Japanese Office Action, Japanese Application No. 2007-549839, 6 pages, Dec. 22, 2009.

*Primary Examiner*—Thomas N Moulis
(74) *Attorney, Agent, or Firm*—King & Spalding L.L.P.

(57) ABSTRACT

In a two-piece fuel reservoir (7), one of the components has a container wall (8) and the other component has a container bottom (9). The components are sealed from each other and can also be configured as a single piece with other components, such as for example a pump bracket (5), thereby allowing for the fuel reservoir (7) to be assembled from standardized components.

13 Claims, 2 Drawing Sheets

U.S. PATENT DOCUMENTS

| | | | |
|---|---|---|---|
| 6,152,174 A * | 11/2000 | Hein | 137/576 |
| 6,176,260 B1 | 1/2001 | Hahner et al. | 137/590 |
| 6,189,513 B1 | 2/2001 | Brown et al. | 123/497 |
| 6,192,869 B1 * | 2/2001 | Hahner et al. | 123/509 |
| 6,213,100 B1 * | 4/2001 | Johansen | 123/509 |
| 6,253,738 B1 * | 7/2001 | Takahashi et al. | 123/509 |
| 6,260,542 B1 * | 7/2001 | Kochsmeier et al. | 123/509 |
| 6,267,103 B1 | 7/2001 | Ludwig et al. | |
| 6,293,258 B1 * | 9/2001 | Frank | 123/509 |
| 6,305,417 B1 | 10/2001 | Kleppner et al. | |
| 6,450,150 B1 * | 9/2002 | Sanden et al. | 123/509 |
| 6,517,327 B2 | 2/2003 | Beyer et al. | 417/363 |
| 6,675,778 B1 * | 1/2004 | Kemper et al. | 123/516 |
| 6,840,231 B2 * | 1/2005 | Suzuki | 123/509 |
| 6,923,164 B1 * | 8/2005 | Mitsudou et al. | 123/509 |
| 7,108,487 B2 * | 9/2006 | Koba et al. | 417/360 |
| 7,198,035 B2 * | 4/2007 | Kadler et al. | 123/509 |
| 7,665,446 B2 * | 2/2010 | Eck et al. | 123/509 |
| 2004/0040602 A1 | 3/2004 | Farrar | 137/565.17 |
| 2004/0091372 A1 | 5/2004 | Besset et al. | |

FOREIGN PATENT DOCUMENTS

| | | |
|---|---|---|
| DE | 4336574 A1 | 5/1995 |
| DE | 19524034 A1 | 1/1997 |
| DE | 19837954 C | 1/2000 |
| DE | 19833698 A1 | 2/2000 |
| DE | 19932684 A1 | 2/2001 |
| DE | 10328355 A | 1/2004 |
| EP | 0578484 A | 1/1996 |
| EP | 0705971 A1 | 4/1996 |
| EP | 0841479 A1 | 5/1998 |
| EP | 1058000 A2 | 12/2000 |
| JP | 2000087820 A | 2/2000 |
| JP | 2001065418 A | 3/2001 |
| WO | 2006072525 A1 | 7/2006 |

* cited by examiner

FUEL RESERVOIR

CROSS-REFERENCE TO RELATED APPLICATIONS

This application is a U.S. national stage application of International Application No. PCT/EP2005/056547 filed Dec. 7, 2005, which designates the United States of America, and claims priority to German application number 10 2005 000 730.9 filed Jan. 4, 2005, the contents of which are hereby incorporated by reference in their entirety.

TECHNICAL FIELD

The invention relates to a fuel reservoir for a motor vehicle, in particular for collecting fuel within a fuel tank and for accommodating a fuel pump, with a container bottom provided for supporting on the fuel tank, and with a container wall connected to the container bottom.

BACKGROUND

Fuel reservoirs of this type are frequently referred to in practice as a surge chamber and are known from practice. The known fuel reservoirs are manufactured as a single piece from plastic by injection molding. A mold which is specially matched to the corresponding fuel reservoir is required for this.

However, the fuel tanks of motor vehicles nowadays differ very greatly, for example with regard to shape and size. Furthermore, a differentiation feature of various container bottoms can be, for example, the contact area. Ribs, bayonet-type connections or receptacles for rubber feet are known for this. It is therefore necessary, for different fuel tanks, to provide different fuel reservoirs which each require a dedicated mold for their manufacturing. New fuel tanks therefore require a considerable structural outlay for the corresponding fuel reservoir.

SUMMARY

A simple adaptation to different fuel tanks can be permitted and the structural outlay for different fuel tanks can be kept as low as possible, for example by a fuel reservoir for a motor vehicle, in particular for collecting fuel within a fuel tank and for accommodating a fuel pump, with a container bottom provided for supporting on the fuel tank, and with a container wall connected to the container bottom, wherein the fuel reservoir comprises two components, wherein a first component having the container wall and a second component having the container bottom, and wherein the first and second components are sealed in relation to each other.

BRIEF DESCRIPTION OF THE DRAWINGS

The invention permits numerous embodiments. To further clarify its basic principle, two of these are illustrated in the drawing and are described below. In the drawing

DETAILED DESCRIPTION

Figure 1:
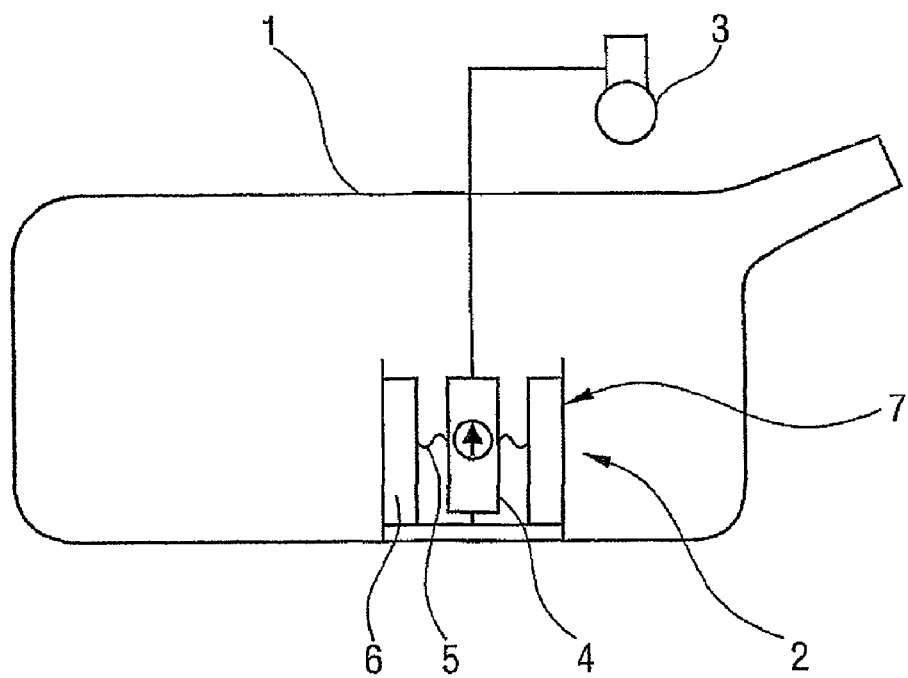
FIG. 1 shows, schematically, a sectional illustration through a fuel tank of a motor vehicle with a fuel reservoir according to an embodiment arranged therein.

By means of this design, the fuel reservoir according to an embodiment can be assembled in a modular manner. In the simplest case, container bottom and container wall can be designed as standard components and can be connected to each other for the appropriate application. For example, for the particular application, the container bottom can have different supporting elements for supporting it on the bottom of the fuel tank. Therefore, for a new fuel tank, only a new mold for the container bottom has to be provided. The container wall can then be connected to the container bottom. Similarly, the container wall for different fuel tanks may have different heights. For the particular fuel tank, the container wall with the appropriate height can then be fitted to the standardized container bottom.

The installation of the feed unit having the fuel reservoir according to an embodiment is simplified if the container wall is manufactured as a single piece with a pump bracket provided for securing the fuel pump.

As a rule, in order to avoid the transmission of structure-borne sound, the fuel pump is mounted on vibration dampers to be fitted individually. According to another embodiment, the separate installation of the vibration dampers can be avoided in a simple manner if the pump bracket is manufactured as a single piece with a vibration damper.

Cavities or upwardly closed chambers within the fuel reservoir can be produced in a simple manner, according to another embodiment, if a component manufactured as a single piece with the container wall is oriented with one wall facing the container bottom.

The installation of the feed unit having the fuel reservoir according to an embodiment is further simplified if the component connected as a single piece to the container wall is a chamber for accommodating a fuel filter.

The fuel reservoir according to an embodiment can be fitted particularly simply and at the same time sealed if the container bottom and the container wall are connected to each other with a cohesive material joint.

The manufacturing costs of the fuel reservoir according to an embodiment are reduced if the container bottom and the container wall are each manufactured from plastic by injection molding and are welded to each other. For the welding, butt-welding with heat reflectors is particularly suitable.

The fuel reservoir according to an embodiment can be fitted in a particularly simple manner if the container bottom and the container wall are connected to each other by a latching connection.

According to another embodiment, the latching connection permits reliable sealing of the container bottom in relation to the container wall if the latching connection has an encircling bead arranged on the container bottom or the container wall, and the opposite component has a receptacle engaging around the bead.

The connection of the fuel reservoir according to an embodiment to further components turned out to be particularly simple if the container bottom and/or the container wall have/has receptacles for the installation of further components. The receptacles can be provided, or example, for standing feet, pump brackets, pressure regulators or suction jet pumps.

FIG. 1 shows, schematically, a longitudinal section through a fuel tank 1 of a motor vehicle with a feed unit 2 arranged therein for feeding fuel from the fuel tank 1 to an internal combustion engine 3 of the motor vehicle. The feed unit 2 has an electrically operated fuel pump 4 arranged in a fuel reservoir 7. The fuel pump 4 is fastened in a pump bracket 5. Furthermore, the feed unit 2 has a fuel filter 6 surrounding the fuel pump 4.

Figure 2:
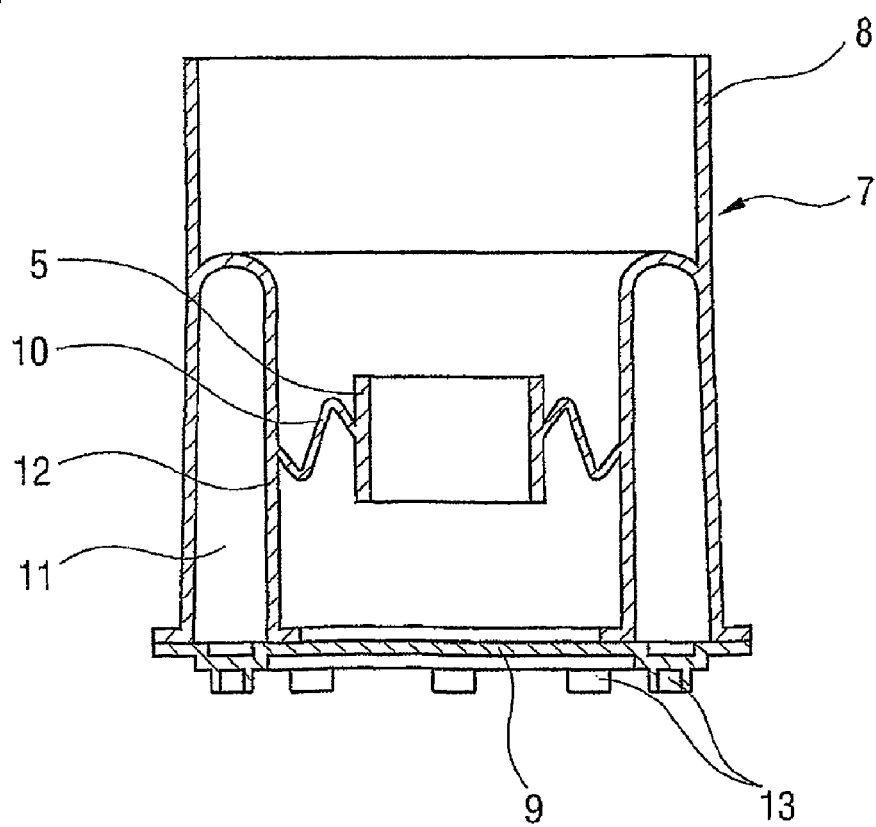
FIG. 2 shows, on a greatly enlarged scale, the fuel reservoir from FIG. 1.

FIG. 2 shows the fuel reservoir 7 from FIG. 1 in a longitudinal section. The fuel reservoir 7 has a container wall 8 and a container bottom 9. The container bottom 9 is tightly welded to the container wall 8. The container wall 8 is manufactured as a single piece with a pump bracket 5 and with a vibration damper 10. Furthermore, the fuel reservoir 7 has a chamber 11 for accommodating the fuel filter 6 illustrated in FIG. 1. A wall 12 of the chamber 11 is manufactured as a single piece with the container wall 8 and is connected at its free end to the container bottom 9 with a cohesive material joint. On its side facing away from the container wall 8, the container bottom 9 has supporting feet 13 with which it is supported on the bottom of the fuel tank 1 from FIG. 1. In addition, rubber buffers (not illustrated) can be pressed on to the supporting feet 13.

To manufacture the fuel reservoir 7, first of all the container bottom 9 can be manufactured with the supporting feet 13, and the container wall 8 can be manufactured with the wall 12 of the chamber 11, the pump bracket 5 and the vibration damper 10, from plastic by injection molding in different molds. Subsequently, the two components are connected in a sealing manner to each other, for example by butt-welding with heat reflectors. For different fuel tanks 1, different components having the container bottom 9 and the container wall 8 can therefore be manufactured and assembled for the particular application.

Figure 3:
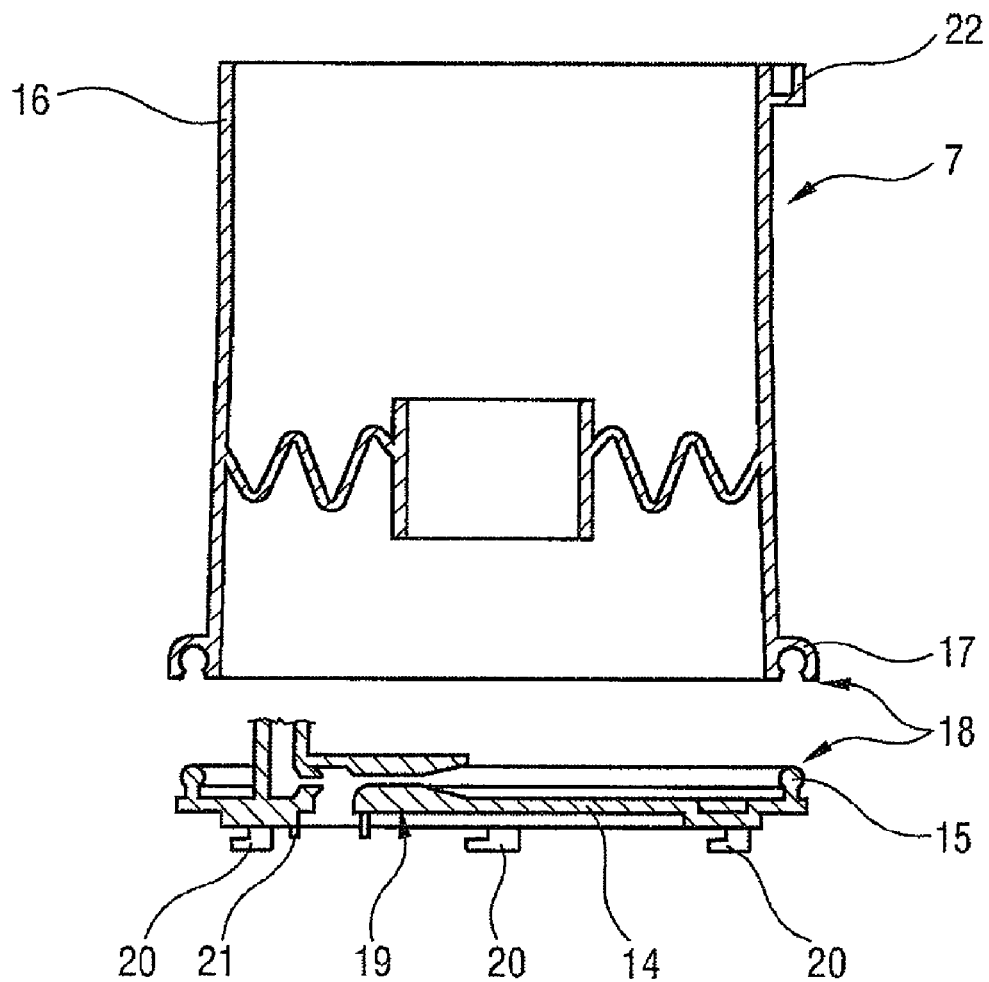
FIG. 3 shows a sectional illustration of a further embodiment of the fuel reservoir from FIG. 1 prior to installation.

FIG. 3 shows a further embodiment of the fuel reservoir 7 in FIG. 1 prior to installation. It can be seen here that a container bottom 14 has an encircling bead 15 and a container wall 16 and a receptacle 17 corresponding to the bead 15. The bead 15 and the receptacle 17 therefore form a latching connection 18 for connecting the container bottom 14 to the container wall 16. The container bottom 14 and the container wall 16 can be compressed in a simple manner for installation.

Contact with fuel causes the bead 15 to swell and ensure that the fuel reservoir 7 has reliable tightness. In addition, the container bottom 14 is manufactured as a single piece with a suction jet pump 19 and with bayonet-like connections 20. The fuel reservoir 7 can be fastened to the correspondingly designed bottom of the fuel tank 1 from FIG. 1 by means of the bayonet-like connections 20. In addition, the container wall 16 and the container bottom 14 each have receptacles 21, 22 for the installation of further components (not illustrated). For example, a cover which covers the fuel reservoir 7 can be fastened to the receptacle 22 of the container wall 16 while the receptacle 21 of the container bottom 14 can secure a foot valve in the region of the suction jet pump 19.

What is claimed is:

1. A fuel reservoir for a motor vehicle, comprising:
   a container bottom provided for supporting on the fuel tank, an integral, single-piece container wall including:
   a free end connected in a sealed manner to the container bottom
   a chamber wall that defines a filter chamber for receiving a filter,
   a pump bracket configured to secure a fuel pump, and
   a vibration damper that connects the pump bracket to the chamber wall.

2. The fuel reservoir as claimed in claim 1, wherein the container bottom and the container wall are connected to each other with a cohesive material joint.

3. The fuel reservoir as claimed in claim 1, wherein the container bottom and the container wall are each manufactured from plastic by injection molding and are welded to each other.

4. The fuel reservoir as claimed in claim 1, wherein the container bottom and the container wall are connected to each other by a latching connection.

5. The fuel reservoir as claimed in claim 4, wherein the latching connection has an encircling bead arranged on the container bottom or the container wall, and the opposite component has a receptacle engaging around the bead.

6. The fuel reservoir as claimed in claim 1, wherein at least one of the container bottom and the container wall has receptacles for the installation of further components.

7. The fuel reservoir as claimed in claim 1, wherein the fuel reservoir collects fuel within a fuel tank and accommodates a fuel pump.

8. A method for manufacturing a fuel reservoir for a motor vehicle, comprising the steps of:
   manufacturing a container bottom,
   manufacturing a container wall an integral, single-piece, the container wall including:
   a chamber wall that defines a filter chamber for receiving a filter,
   a pump bracket configured to secure a fuel pump, and
   a vibration damper that connects the pump bracket to the chamber wall, and
   connecting the container wall to the container bottom in a sealed manner.

9. The method as claimed in claim 8, further comprising the step of connecting the container bottom and the container wall to each other with a cohesive material joint.

10. The method as claimed in claim 8, further comprising the step of manufacturing the container bottom and the container wall from plastic by injection molding and welding the container bottom to the container wall.

11. The method as claimed in claim 8, further comprising the step of connecting the container bottom and the container wall to each other by a latching connection.

12. The method as claimed in claim 11, wherein the latching connection has an encircling bead arranged on the container bottom or the container wall, and the opposite component has a receptacle engaging around the bead.

13. The method as claimed in claim 8, wherein at least one of the container bottom and the container wall has receptacles for the installation of further components.

* * * * *